United States Patent [19]

Christenson et al.

[11] 4,335,829
[45] Jun. 22, 1982

[54] COATED METAL SURFACES AND METHOD OF COATING METAL SURFACES WITH AQUEOUS RESINOUS DISPERSIONS OF EPOXY RESINS AND ACRYLIC POLYMERS

[75] Inventors: Roger M. Christenson, Gibsonia; Rudolf Maska, Pittsburgh; Rostyslaw Dowbenko; Thomas R. Hockswender, both of Gibsonia, all of Pa.

[73] Assignee: PPG Industries, Inc., Pittsburgh, Pa.

[21] Appl. No.: 964,549

[22] Filed: Nov. 29, 1978

[51] Int. Cl.³ .................. B65D 8/00; B05D 3/02; B32B 15/08; B32B 27/38

[52] U.S. Cl. .................. 220/458; 428/35; 428/418; 428/461; 427/386; 427/388.4; 525/118; 525/119; 523/411; 524/813; 524/767

[58] Field of Search .......... 260/29.2 EP, 29.6 RB, 260/29.6 NR, 834, 831, 836; 428/35, 418, 522, 461, 463; 427/388 C, 386, 388.4; 220/458; 525/118, 119

[56] References Cited

U.S. PATENT DOCUMENTS

| | | | |
|---|---|---|---|
| 2,992,132 | 7/1961 | Melamed | 427/403 X |
| 3,008,914 | 11/1961 | Fry | 260/33.4 |
| 3,198,850 | 8/1965 | Leuantin | 260/834 |
| 3,215,756 | 11/1965 | Lombardi et al. | 260/834 |
| 3,492,252 | 1/1970 | Euchner et al. | 260/8 |
| 3,509,086 | 4/1970 | Rohrbacher | 260/32.8 |
| 3,908,049 | 9/1975 | Fitko | 427/386 |
| 3,943,187 | 3/1976 | Wu | 260/837 R |
| 3,997,694 | 12/1976 | Wu | 428/35 |

FOREIGN PATENT DOCUMENTS 694853 9/1964 Canada ................ 260/834

*Primary Examiner*—Michael R. Lusignan
*Attorney, Agent, or Firm*—William J. Uhl

[57] ABSTRACT

An aqueous resinous dispersion and a method of coating employing the aqueous resinous dispersion are disclosed. The aqueous resinous dispersions are solubilized with base and comprise an acrylic polymer containing N-ethoxymethylacrylamide or methacrylamide moieties and an epoxy resin. The dispersion is useful for coating metal containers particularly as a coating for the interior of containers which are used for alcoholic beverages, for example, beer cans.

12 Claims, No Drawings

COATED METAL SURFACES AND METHOD OF COATING METAL SURFACES WITH AQUEOUS RESINOUS DISPERSIONS OF EPOXY RESINS AND ACRYLIC POLYMERS

BACKGROUND OF THE INVENTION

1. Field of the Invention

This invention relates to aqueous, base-solubilized resinous dispersions of acrylic polymers in combination with epoxy resins. More particularly, this invention relates to coating metal containers such as containers for alcoholic beverages with these aqueous dispersions.

2. Brief Description of the Prior Art

In the manufacture of metal containers for food and beverages, a resinous coating is applied to the interior of the container. A coating is necessary because the bare metal can affect the taste or even ruin the contents of the container. To be effective, the coating must be as continuous and as void free as possible and, of course, must also not affect the taste of the container contents itself. Many of the prior art container coating compositions are organic solvent based. However, because of environmental problems these coatings create, they are being replaced by aqueous-based coating compositions.

Examples of water-based container coatings are those described in U.S. Pat. Nos. 3,943,187 and 3,997,694 to Wu. These compositions are based on amine solubilized acrylic polymers in combination with epoxy resins. The acrylic interpolymers are prepared by solution polymerization techniques in alcoholic solvents and contain from about 0.5 to 10 percent by weight of acrylic acid and 1 to 10 percent by weight of a higher alkoxymethylacrylamide or methacrylamide such as N-butoxymethylacrylamide. Although such compositions are probably useful in many container coating applications, we believe that there are a number of disadvantages associated with such compositions. First of all, the dispersions do not have long-term stability. Although the acrylic acid content can be as high as 10 percent, it has been found that aqueous coating compositions of the acrylic-epoxy type in which the acrylic polymer is prepared with higher levels of acrylic acid or a comparable acid, that is, about 15 to 85 percent and preferably from about 20 to 70 percent, and more preferably 30 to 60 percent, are more compatible with the epoxy resin component resulting in more dispersible compositions which have better curing properties.

Also, acrylic polymers prepared with N-butoxymethylacrylamide may not be completely acceptable for use in coating compositions for interior liners of alcoholic beverage containers such as beer cans especially if undercured. Such acrylic polymers contain residual butanol in a combined form which could furnish free butanol upon hydrolysis. Butanol, even in minute concentrations, can adversely affect the taste of the beer. Also, the acrylic polymers of the aforementioned prior art are prepared by solution polymerization techniques in the presence of primary and secondary alcoholic solvents such as butanol and isopropanol. Thus, even if the acrylic polymers were prepared with N-ethoxymethylacrylamide or methacrylamide moieties such as required by the present invention, there is a danger of some transetherification in the acrylic polymerization step which could result in residual amounts of the alcoholic solvent such as butanol and isopropanol combined with the acrylic polymer which, as explained above, could adversely affect the taste of the beer.

SUMMARY OF THE INVENTION

In accordance with the present invention, an improved aqueous base solubilized resinous dispersion suitable for coating the interior surfaces of containers particularly containers for alcoholic beverages such as beer cans is provided. The resinous phase of the dispersion comprises:

(A) from 15 to 90 percent by weight of an acrylic polymer which is formed by solution polymerizing in the absence of primary and secondary alcohols other than ethanol, the following polymer charge:
 (1) from 15 to 85 percent by weight of an alpha, beta-ethylenically unsaturated carboxylic acid,
 (2) from 5 to 85 percent by weight of N-ethoxymethylacrylamide or N-ethoxymethylmethacrylamide,
 (3) from 0 to 80 percent by weight of a copolymerizable vinyl monomer different from (1) and (2); the percentages by weight of (1), (2) and (3) being based on total weight of (1), (2) and (3);
(B) from 10 to 85 percent by weight of an epoxy resin; the percentages by weight of (A) and (B) being based on total weight of (A) and (B).

The invention also provides for a method of coating which involves applying to a metal surface a coating composition which contains the aqueous resinous dispersion described above and heating the metal surface to a temperature sufficient to coalesce and cure the coating composition.

PRIOR ART

In addition to the prior art mentioned above, the following prior art is considered pertinent because it relates to acrylic polymer-epoxy resin compositions: U.S. Pat. Nos. 2,992,132; 3,008,914; 3,179,714; 3,198,850; 3,215,756; 3,492,252; 3,509,086; 3,908,049 and Canadian Pat. No. 694,853.

DETAILED DESCRIPTION

The aqueous resinous dispersion of the present invention contain as the resinous phase from about 15 to 90, preferably 20 to 75 percent by weight of a base solubilized acrylic polymer and from about 10 to 85, preferably 20 to 80 percent by weight of an epoxy resin.

The acrylic polymer is formed by solution polymerizing the following monomers in the absence of primary and secondary alcoholic solvents other than ethanol:
(1) from about 15 to 85, preferably 20 to 70, more preferably 30 to 60 percent by weight of an alpha, beta-ethylenically unsaturated carboxylic acid;
(2) from about 5 to 85 and preferably from 15 to 50 percent by weight of N-ethoxymethylacrylamide or N-ethoxymethylmethacrylamide, measured as acrylamide or methacrylamide respectively;
(3) from about 0 to 80, preferably 20 to 60 percent by weight of a copolymerizable alpha, beta-ethylenically unsaturated monomer or mixture of monomers different from (1) and (2);
the percentages by weight of (1), (2) and (3) being based on total weight of (1), (2) and (3).

The alpha, beta-ethylenically unsaturated carboxylic acid provides sites for neutralization to disperse the resinous phase and also provides sites for reaction with epoxy functionality resulting in compatibility of two components in the dispersed phase. The carboxylic acid groups are also believed to promote curing of the resinous compositions. Examples of suitable alpha, beta-ethylenically unsaturated carboxylic acids are those containing from about 3 to 8 carbon atoms such as acrylic acid and methacrylic acid, both of which are preferred. Acids such as itaconic acid, maleic acid, fumaric acid, monoesters of unsaturated dicarboxylic acids such as methyl hydrogen maleate and ethyl hydrogen fumarate, as well as anhydrides such as maleic anhydride can also be used, although their use is not preferred.

The N-ethoxymethylacrylamide or N-ethoxymethylmethacrylamide provides curing sites in the polymer. Use of less than 5 percent by weight of the component results in insufficient cure, whereas use of greater than 85 percent by weight results in excessive brittleness in the film.

In addition to the above ingredients, the acrylic polymer will also be prepared from some other different copolymerizable alpha, beta-ethylenically unsaturated monomer. The other copolymerizable monomer can be selected from a wide variety of materials depending upon the properties desired in the acrylic polymer. For example, at least a portion of the other copolymerizable monomer can be vinyl aromatic compounds which are desirable because of good water and pasteurization resistance. Examples of the vinyl aromatic monomers are styrene which is preferred and alpha-methylstyrene, tertiary-butylstyrene, vinyl toluene and vinyl xylene.

In addition to vinyl aromatic monomers, alkyl esters of methacrylic acid which contain from 1 to 3 carbon atoms in the alkyl group can also be used. Examples of suitable alkyl esters of methacrylic acid are methyl methacrylate which is preferred and ethyl methacrylate.

Alkyl esters of acrylic acid having from 2 to 12 carbon atoms in the alkyl group and alkyl esters of methacrylic acid containing from 4 to 12 carbon atoms in the alkyl group can also be used at least in part as the other copolymerizable monomer. These particular monomers provide flexibility. Examples of suitable vinyl monomers of this type are ethyl acrylate, propyl acrylate, butyl acrylate, hexyl acrylate, 2-ethylhexyl acrylate, butyl methacrylate and 2-ethylhexyl methacrylate.

Obviously, mixtures of the different vinyl monomers mentioned above can be used.

The acrylic polymer which is used in the practice of the invention is prepared by free radical initiated polymerization of a mixture of the copolymerizable acrylic monomers described above by solution polymerization techniques in the absence of primary and secondary alcohol solvents other than ethanol. Usually the acrylic monomers are dissolved in the solvent or a mixture of solvents and polymerized until the free monomeric content is reduced to below 0.5 percent, preferably 0.1 percent. Polymerization under these conditions results in polymers having reduced Gardner-Holdt viscosities of from A to Z, preferably C to L. The reduced viscosity is determined at about 25° C. by diluting the acrylic polymer reaction mixture with 2-butoxyethanol to about 20 percent resin solids.

Examples of free radical initiators are those which are soluble in the polymerization medium such as azobis(alpha-gamma)-dimethylvaleronitrile, tertiary-butyl perbenzoate, tertiary-butyl peracetate and benzoyl peroxide.

Usually the solvent is first heated to reflux and the mixture of acrylic monomers and the free radical initiator are added simultaneously and slowly to the refluxing solvent. Additional catalyst is optionally added and the reaction mixture held at polymerizing temperatures so as to reduce the free monomer content of the reaction mixture. For water-based compositions, water-soluble or water-miscible solvents are used in the polymerization. Examples include ethanol, tertiary alcohols such as tertiary-butanol, tertiary-amyl alcohol; ketones such as acetone, methyl ethyl ketone; ethers such as the dimethyl ether of ethylene glycol. Also moderate levels of water-insoluble solvents such as toluene can be used. Mixtures of suitable solvents including mixtures of water-soluble solvents with water can also be used. Primary and secondary alcoholic solvents other than ethanol such as n-butyl alcohol, isopropyl alcohol, various monoalkyl ethers of ethylene glycol are not used in the polymerization process because of the danger of transetherification with the ethoxymethylacrylamide and methacrylamide moieties.

The compositions of the present invention are dispersed in aqueous medium by treating with base. The compositions can be dispersed in a number of ways. For example, the acrylic polymer can be treated with base, dispersed in water and then combined with the epoxy resin. Alternately, the acrylic polymer can be combined with the epoxy resin and the combination treated with base and dispersed in water.

The aqueous dispersions of the present invention can be two-phase translucent, aqueous resin systems, especially those in which the aqueous phase is continuous.

Preferably, the acrylic polymer and epoxy resin are held together at elevated temperature, that is, about 40° to 85° C., preferably 50° to 80° C., for at least 10 minutes and preferably between 15 minutes and 8 hours. Holding at these times and temperatures results in products which have the most reproducible properties.

Suitable bases are amines such as water-soluble amine including ammonia, primary, secondary and tertiary amines including hydroxyl alkyl amines. In addition to ammonia, examples include ethanolamine, diethanolamine, N-methylethanolamine, dimethylethanolamine, methylamine, ethylamine, diethylamine, trimethylamine, triethylamine and morpholine. The amount of base employed will be equivalent to at least 25 percent of the total theoretical neutralization. The dispersion can be completely neutralized and extra amine added as a solvent. Usually the pH of the final aqueous dispersion is adjusted to about 7.5 to 11.

The epoxy resins useful in the practice of the invention are polyepoxides, that is, resinous materials having a 1,2-epoxy equivalency greater than one. The preferred polyepoxides are polyglycidyl ethers, particularly polyglycidyl ethers of polyphenols such as Bisphenol A. These can be produced, for example, by etherification of a polyphenol with epihalohydrin or dihalohydrin such as epichlorohydrin or dichlorohydrin in the presence of alkali. Besides Bisphenol A, which is bis-2,2-(4-hydroxyphenyl)propane, the polyphenol can be, for example, 4,4'-dihydroxybenzophenone, bis-1,1-(4-hydroxyphenyl)ethane, bis-1,1-(4-hydroxyphenyl)isobutane, bis-2,2-(4-hydroxytertiarybutyl-phenyl)propane, bis-(2-hydroxynaphthyl)methane and 1,5-dihydroxynaphthalene.

Preferably, the epoxy resin has an epoxide equivalent of about 850 to 2500 (measured as 100 percent solids). Typically preferred resins are those available from Shell Chemical Company under the trademark EPON.

Under some conditions, it may be desirable to add up to 40, usually up to 20 percent by weight of an external crosslinker such as an aminoplast resin into the dispersion. Examples of suitable aminoplast resins are alkylated melamine-formaldehyde resins containing from about 1 to 6 carbon atoms in the alkyl group, the urea-formaldehyde resins or benzoguanamine-formaldehyde resins. Typical alkylated melamine-formaldehyde resins are hexakis(methoxymethyl) melamine, mixed methoxy and ethoxy methyl melamine-formaldehyde resins and butylated melamine-formaldehyde resins. Examples of other external crosslinkers which can be added to the dispersion include phenol-formaldehyde resin and blocked polyisocyanates.

The compositions of the present invention are used in the form of aqueous dispersions. The resin solids content of the aqueous dispersion will vary depending upon the end use envisioned. Resin solids contents from about 15 to 30 percent by weight in aqueous medium are typical of the invention. For container coating applications, resin solids contents of about 18 to 25 percent are preferred for spraying applications. The aqueous medium consists of at least 40 percent, preferably at least 50 percent and most preferably at least 70 percent by weight water with the remainder being organic solvent such as those mentioned above.

The aqueous dispersions of the present invention can optionally contain a pigment, especially when not used in the inside of a container. The pigments may be any of the conventional types including, for example, iron oxides, titanium dioxide, metal hydroxides, metal flakes, metal powders, sulfates, carbonates, carbon black, silica, talc, mica, as well as color pigments such as cadmium yellow and cadmium red.

In addition to the above ingredients, various fillers, plasticizers, anti-oxidants, ultraviolet light absorbers, flow control agents, surfactants and other formulating additives can optionally be employed if desired.

The compositions of the present invention can be applied to a variety of substrates such as glass, plastics, metals and particularly metals such as aluminum and steel. The compositions without certain optional ingredients which would be harmful are particularly useful for coating the interior surface of metal containers which are used for alcoholic beverages, for example, beer cans. The usual coating methods can be employed such as spraying, including air, airless and electrostatic spraying, brushing, dipping, roller coating and the like. For coating metal containers, spraying is the preferred method of application. Although the preferred use of the compositions of the invention is for coating the interior surface of metal containers, the compositions can be used for coating the outside surfaces of metal containers as well as other articles such as metal coil.

After the coating composition has been applied to the metal surface, the metal surface is heated to a temperature sufficient to coalesce and cure the coating composition. Typical curing conditions are from 150° to 370° C. for about 5 seconds to 45 minutes. The coating weight preferred for metal cans is about 0.5 to 15 milligrams per square inch of metal surface. This will correspond to a coating thickness of about 0.05 to 2 mils.

The following examples illustrate the invention. The parts and percentages are by weight unless otherwise specified.

EXAMPLE I

An acrylic polymer was prepared as follows:

| Ingredients | Parts by Weight |
|---|---|
| Kettle Charge | |
| t-butyl alcohol | 124.4 |
| water | 35.5 |
| Monomer Charge | |
| N-ethoxymethylacrylamide[1] | 154.4 |
| acrylic acid | 83.5 |
| styrene | 89.8 |
| Initiator Charge | |
| benzoyl peroxide[2] | 6.5 |
| toluene | 32.9 |
| ethanol[3] | 9.9 |
| Rinse | |
| t-butanol | 5.9 |
| Feed A | |
| benzoyl peroxide | 1.1 |
| toluene | 12.1 |
| Feed B | |
| benzoyl peroxide | 1.1 |
| toluene | 12.1 |
| Feed C | |
| benzoyl peroxide | 1.1 |
| toluene | 12.1 |

[1] 36 percent solids solution of N-ethoxymethylacrylamide in ethanol.
[2] 78 percent aqueous solution (free radical initiator).
[3] 95 percent aqueous solution.

The kettle charge was heated under a nitrogen atmosphere to reflux at 175° F. (79° C.). The N-ethoxymethylacrylamide, acrylic acid and styrene were premixed to form a monomer charge and fed continuously to the reaction mixture over the period of 5 hours. The ethanol and the first portions of benzoyl peroxide and toluene were premixed to form an initiator charge and fed continuously to the reaction vessel over a period of 5 hours simultaneously with the monomer charge. At the completion of the monomer and initiator additions, the vessels used to hold these ingredients were rinsed with the second portion of t-butyl alcohol and the rinse charged to the reaction vessel followed by the addition of Feed A. The reaction mixture was held at reflux for one hour followed by the addition of Feed B; the reaction mixture held at reflux for an hour followed by the addition of Feed C; and the reaction mixture held at reflux for two hours. The reaction mixture had a solids content (determined at 150° C.) of about 40 percent and an acid number of about 106.3. The reduced Gardner-Holdt viscosity when diluted on a 1:1 weight ratio with 2-butoxyethanol was E+.

The acrylic polymer prepared as described above was solubilized with amine, dispersed in water and combined with an epoxy resin as follows:

| Ingredients | Parts by Weight |
|---|---|
| acrylic polymer prepared as described above | 106.5 |
| triethylamine | 23.9 |
| water | 73.5 |
| epoxy resin[1] | 205.4 |
| water | 350.0 |

[1] The epoxy resin was a polyglycidyl ether of Bisphenol A having an epoxy equivalent weight of 1450 (100 percent solids). The epoxy resin was a 60 percent resin solids in a 51.8/49.2 mixture of 2-butoxyethanol and butanol.

The acrylic polymer was charged to a reaction vessel with agitation followed by the addition of the triethylamine and deionized water. The contents of the reaction vessel were heated to 158° F. (70° C.) followed by the addition of the epoxy resin. The contents of the reaction vessel were held at about 150° F. (66° C.) for 15 minutes followed by the addition of the second portion of deionized water and heating to 176° F. (80° C.) and holding for 6 hours. The reaction mixture was then cooled to room temperature. The reaction product had an acid value of 5.9, a solids content of 20.4, a pH of 9.6 and a viscosity (No. 4 Ford Cup) of 34.4.

EXAMPLE II

Example I was repeated with the exception that a polyglycidyl ether of Bisphenol A having an epoxy equivalent weight of 980 (100 percent solids, EPON 1004 commercially available from Shell Chemical Company) was used in place of the epoxy resin of Example I.

The aqueous dispersion was prepared from the following charge:

| Ingredients | Parts by Weight |
| --- | --- |
| acrylic polymer of Example I | 100.4 |
| triethylamine | 24.2 |
| water | 70.0 |
| epoxy resin[1] | 186.8 |
| water | 360.0 |

[1] The epoxy resin was a 60 percent resin solids in a 51.8/49.2 mixture of 2-butoxyethanol and butanol.

The aqueous resinous dispersion had a solids content of 21.7, a pH of 9.74 and a viscosity (No. 4 Ford Cup) of 21.2.

EXAMPLE III

An acrylic polymer similar to that used in Example I, but using methacrylic acid in place of acrylic acid, was prepared as follows:

| Ingredients | Parts by Weight |
| --- | --- |
| Kettle Charge | |
| t-butyl alcohol | 870.8 |
| deionized water | 248.5 |
| Monomer Charge | |
| NEMA[1] | 1080.8 |
| methacrylic acid | 584.5 |
| styrene | 628.6 |
| Initiator Charge | |
| ethanol | 69.3 |
| toluene | 230.3 |
| benzoyl peroxide | 55.0 |
| Rinse | |
| t-butyl alcohol | 41.3 |
| Feed A | |
| toluene | 84.7 |
| benzoyl peroxide | 11.0 |
| Feed B | |
| toluene | 84.7 |
| benzoyl peroxide | 11.0 |
| Feed C | |
| toluene | 84.7 |
| benzoyl peroxide | 11.0 |

[1] N-ethoxymethylacrylamide solution as described in Example I.

The kettle charge was heated under a nitrogen atmosphere to reflux. The acrylic monomers were premixed and fed continuously to the reaction vessel over a period of 5 hours. The ethanol and the first portions of toluene and benzoyl peroxide were premixed and charged to the reaction vessel over the period of 5 hours simultaneously with the monomer feed. When the monomer and catalyst additions were completed, the vessels were rinsed with the second portion of t-butyl alcohol followed by the addition of Feed A. The reaction mixture was held for one hour at reflux (82° C.), followed by the addition of Feed B, holding for 1½ hours at reflux followed by the addition of Feed C and holding at reflux for two hours. The reaction mixture had a solids content of 37.4 percent and an acid value of 63.8. The reduced viscosity when diluted on a 1:1 weight ratio with 2-butoxyethanol was B.

The acrylic polymer prepared as described above was neutralized with triethylamine, dispersed in deionized water and combined with the polyglycidyl ether of Example I in the following charge:

| Ingredients | Parts by Weight |
| --- | --- |
| acrylic polymer | 608.4 |
| triethylamine | 170.9 |
| deionized water | 420.0 |
| epoxy resin of Example I | 1173.6 |
| deionized water | 2000.0 |

The acrylic polymer was charged to a reaction vessel and the triethylamine and the first portion of deionized water added and the mixture heated to 55' C. The epoxy resin was then added and the contents of the reaction vessel held for one hour and 15 minutes at 55° C. The reduced viscosity of the mixture measured as a 50:50 solution in N-methyl-2-pyrrolidone was B−. The second portion of deionized water was then added and the mixture heated at 78°–80° C. for 6 hours. The mixture was cooled and found to have a total solids content of 22.7, a pH of 9.5, and a viscosity of 18.6 seconds as measured with a No. 4 Ford Cup.

EXAMPLE IV

The following example shows the preparation of an aqueous dispersion similar to Example I with the exception that 25 percent by weight of the N-ethoxymethylacrylamide was used instead of the 15 percent by weight loadings in Example I.

Using the procedure of Example III, an acrylic polymer was prepared from the following charge:

| Ingredients | Parts by Weight |
| --- | --- |
| Kettle Charge | |
| t-butyl alcohol | 746.7 |
| deionized water | 213.0 |
| Monomer Charge | |
| NEMA | 1544.0 |
| acrylic acid | 501.7 |
| styrene | 416.0 |
| Initiator Charge | |

| Ingredients | Parts by Weight |
|---|---|
| ethanol | 59.4 |
| benzoyl peroxide | 39.3 |
| toluene | 250.0 |
| *Rinse* | |
| t-butyl alcohol | 24.0 |
| ethanol | 11.4 |
| *Feed A* | |
| toluene | 55.0 |
| benzoyl peroxide | 6.5 |
| *Feed B* | |
| toluene | 55.0 |
| benzoyl peroxide | 6.5 |
| *Feed C* | |
| toluene | 55.0 |
| benzoyl peroxide | 6.5 |

The acrylic polymer had a total solids content of 38.2 percent, an acid number of 85.7 and a Gardner-Holdt reduced viscosity in a 1/1 weight ratio with 2-butoxyethanol of F−.

The acrylic polymer prepared as described above was neutralized with triethylamine, dispersed in water and combined with the epoxy-containing resin as generally described in Example III in the following charge:

| Ingredients | Parts by Weight |
|---|---|
| acrylic polymer | 608.4 |
| triethylamine | 136.7 |
| deionized water | 420.0 |
| epoxy resin of Example I | 1173.6 |
| deionized water | 2000.0 |

The final product had a total solids content of 23.7 percent, a viscosity of 18.3 seconds (No. 4 Ford Cup), a pH of 9.8, contained 0.125 milliequivalents of acid and 0.297 milliequivalents of base per gram of solution.

EXAMPLE V

The following example shows the preparation of an aqueous resinous dispersion similar to that of Example I but one in which the acrylic polymer was prepared with butyl acrylate in place of styrene.

Using the procedure of Example III, an acrylic polymer was prepared from the following charge:

| Ingredients | Parts by Weight |
|---|---|
| *Kettle Charge* | |
| t-butyl alcohol | 870.8 |
| deionized water | 248.5 |
| *Monomer Charge* | |
| NEMA | 1080.8 |
| acrylic acid | 584.5 |
| butyl acrylate | 628.6 |
| *Initiator Charge* | |
| toluene | 230.3 |
| ethanol | 69.3 |
| benzoyl peroxide | 45.8 |
| *Rinse* | |
| t-butyl alcohol | 41.3 |
| *Feed A* | |
| toluene | 84.7 |
| benzoyl peroxide | 7.6 |
| *Feed B* | |
| toluene | 84.7 |
| benzoyl peroxide | 7.6 |
| *Feed C* | |
| toluene | 84.7 |
| benzoyl peroxide | 7.6 |

The reaction product had a total solids content of 36.9 percent and an acid value of 95.5. The Gardner-Holdt reduced viscosity was E.

Using the procedure of Example III, the acrylic polymer was neutralized, dispersed in water and combined with an epoxy resin in the following charge:

| Ingredients | Parts by Weight |
|---|---|
| acrylic polymer | 608.4 |
| triethylamine | 136.7 |
| deionized water | 420.0 |
| epoxy resin of Example I | 1173.6 |
| deionized water | 2000.0 |

The final aqueous dispersion had a total solids content of 18.7 percent, a viscosity of 21.0 seconds (No. 4 Ford Cup), a pH of 9.5 and contained 0.161 milliequivalents of acid and 0.234 milliequivalents of base per gram of solution.

EXAMPLE VI

The following example shows the preparation of an aqueous resinous dispersion similar to that of Example I with the exception that a polyglycidyl ether of Bisphenol A having an epoxy equivalent weight of 2300 (100 percent solids, EPON 1007 commercially available from Shell Chemical Company) was used in place of the epoxy resin of Example I.

Using the procedure of Example III, the acrylic polymer of Example I was neutralized, dispersed in water and combined with the epoxy resin in the following charge:

| Ingredients | Parts by Weight |
|---|---|
| acrylic polymer of Example I | 608.4 |
| triethylamine | 136.7 |
| deionized water | 420.0 |
| epoxy resin solution[1] | 1173.6 |
| deionized water | 2000.0 |

[1] The epoxy resin was a 60 percent resin solids in a 51.8/49.2 mixture of 2-butoxyethanol and butanol.

The aqueous dispersion had a solids content of 22.8 percent, a viscosity of 21.8 seconds (No. 4 Ford Cup), a pH of 9.2 and contained 0.209 milliequivalents of acid and 0.291 milliequivalents of base per gram of resin solution.

EXAMPLE VII

The following example shows the preparation of an aqueous dispersion similar to that of Example I with the exception that ethyl acrylate was used in place of styrene.

Using the procedure of Example III, an acrylic polymer was prepared from the following charge:

| Ingredients | Parts by Weight |
|---|---|
| Kettle Charge | |
| t-butyl alcohol | 870.8 |
| deionized water | 248.5 |
| Monomer Charge | |
| NEMA | 1080.8 |
| acrylic acid | 584.5 |
| ethyl acrylate | 628.6 |
| Initiator Charge | |
| toluene | 230.3 |
| ethanol | 69.3 |
| benzoyl peroxide | 45.8 |
| Rinse | |
| t-butyl alcohol | 41.3 |
| Feed A | |
| toluene | 84.7 |
| benzoyl peroxide | 7.6 |
| Feed B | |
| toluene | 84.7 |
| benzoyl peroxide | 7.6 |
| Feed C | |
| toluene | 84.7 |
| benzoyl peroxide | 7.6 |

The reaction product had a total solids content of 38.2 and an acid value of 97.3. The reduced Gardner-Holdt viscosity was G+.

Using the procedure of Example III, the acrylic polymer prepared as described above was neutralized with triethylamine, dispersed in water and combined with the epoxy resin of Example I in the following charge:

| Ingredients | Parts by Weight |
|---|---|
| acrylic polymer | 629.1 |
| triethylamine | 136.7 |
| deionized water | 420.0 |
| epoxy resin | 1173.6 |
| deionized water | 2000.0 |

The final aqueous dispersion had a total solids content of 19.2, a viscosity of 20.2 seconds (No. 4 Ford Cup), a pH of 8.8 and contained 0.177 milliequivalents of acid and 0.240 milliequivalents of base per gram of resin solution.

EXAMPLE VIII

The following example shows the preparation of an aqueous resinous dispersion in which the acrylic polymer was prepared with 25 percent by weight acrylic acid instead of 41 percent acrylic acid such as was used in the preceding examples.

Using the procedure of Example III, the acrylic polymer was prepared from the following charge:

| Ingredients | Parts by Weight |
|---|---|
| Kettle Charge | |
| t-butyl alcohol | 870.8 |
| deionized water | 248.5 |
| Monomer Charge | |
| NEMA | 1080.8 |
| acrylic acid | 356.4 |
| styrene | 855.4 |
| Initiator Charge | |
| toluene | 230.3 |
| ethanol | 69.3 |
| benzoyl peroxide | 55.0 |
| Rinse | |
| t-butyl alcohol | 41.3 |
| Feed A | |
| toluene | 84.7 |
| benzoyl peroxide | 11.0 |
| Feed B | |
| toluene | 84.7 |
| benzoyl peroxide | 11.0 |
| Feed C | |
| toluene | 84.7 |
| benzoyl peroxide | 11.0 |

The reaction product had a total solids content of 37.9 percent, an acid value of 57.8 and a Gardner-Holdt reduced viscosity of A−.

The acrylic polymer prepared as described above was neutralized with triethylamine, dispersed in deionized water and combined with the epoxy resin of Example I in the following charge:

| Ingredients | Parts by Weight |
|---|---|
| acrylic polymer | 1057.0 |
| triethylamine | 125.1 |
| deionized water | 420.0 |
| epoxy resin | 1173.6 |
| deionized water | 2000.0 |

The acrylic polymer was charged to a reaction vessel and the triethylamine and the first portion of deionized water added and the mixture heated to 55° C. The epoxy resin was then added and the contents of the reaction vessel held for 20 minutes at 55° C. The reduced viscosity of the mixture measured as a 50:50 solution in N-methyl-2-pyrrolidone was A−. The second portion of deionized water was then added and the mixture heated at 78°–81° C. for 6 hours. The mixture was cooled and found to have a total solids content of 24.9 percent, a pH of 9.5, a viscosity of 21.2 seconds (No. 4 Ford Cup) and to contain 0.216 milliequivalents of acid and 0.264 milliequivalents of base per gram of resin solution.

EXAMPLE IX

The following example shows the preparation of an aqueous resinous dispersion similar to that of Example I but with the exception that ammonia was used in place of the triethylamine for dispersing the acrylic polymer.

The aqueous resinous dispersion was prepared from the following charge:

| Ingredients | Parts by Weight |
|---|---|
| acrylic polymer of Example I | 608.4 |
| 28% aqueous ammonia | 84.8 |
| deionized water | 420.0 |
| epoxy resin of Example I | 1173.6 |
| triethylamine | 93.2 |
| deionized water | 2000.0 |

The acrylic polymer was charged to a reaction vessel and the 28 percent aqueous ammonia and first portion of deionized water were charged over a perod of 20 minutes from below the surface of the ingredients. The ingredients of the reaction vessel were heated to 55° C. and held for 5 minutes followed by the addition of the epoxy resin and the temperature held at 50° C. for 40 minutes followed by the addition of the triethylamine. Deionized water was added over a period of 50 minutes while maintaining the ingredients at a temperature of 56° C. The ingredients were then heated to 78°-81° C. and held at this temperature for 6 hours. The mixture had a solids content of 22.1 percent, a viscosity of 19.4 seconds (No. 4 Ford Cup), and a pH of 10.0.

Also, at these temperatures, both 130 and 180 milligrams of coating materials (determined after baking) were applied which are equivalent to 3 and 4 milligrams per square inch respectively.

In the phosphoric acid and beer pasteurization resistance tests, 180 milligrams of coating material were applied to the interior surfaces at coating temperatures of 22° C.

The results of the testing are presented in Table I below.

TABLE I

| Example No. | Phoshoric Acid Resistance After 10 Days | Beer Pasteurization Resistance | Enamel Rater Results | | | |
|---|---|---|---|---|---|---|
| | | | 72° F. (22° C.) | | 120° F. (49° C.) | |
| | | | 130 milligrams | 180 milligrams | 130 milligrams | 180 milligrams |
| I | no coating deterioration | no coating deterioration; no loss of adhesion[1] | 7.8 | 1.4 | 2.3 | 0.9 |
| II | no coating deterioration | no coating deterioration; no loss of adhesion[1] | 3.0 | 2.2 | 4.8 | 1.0 |
| III | no coating deterioration | no coating deterioration no loss of adhesion[1] | 74.2 | 63.8 | 30.3 | 15.0 |
| IV | no coating deterioration | no coating deterioration; 3-8% loss of adhesion | 8.9 | 1.8 | 2.5 | 1.2 |
| V | no coating deterioration | no coating deterioration; no loss of adhesion | 12.2 | 13.8 | 5.8 | 3.8 |
| VI | no coating deterioration | no coating deterioration; no loss of adhesion | 5.3 | 1.8 | 8.0 | 9.4 |
| VII | no coating deterioration | no coating deterioration; no loss of adhesion | 69.5 | 36.4 | 19.5 | 18.5 |
| VIII | no coating deterioration | no coating deterioration; no loss of adhesion | 4.3 | 3.3 | 3.4 | 3.4 |
| IX | no coating deterioration | no coating deterioration; no loss of adhesion | 3.9 | 1.4 | 2.9 | 2.6 |

[1]Crosshatch adhesion - Bottom interior surface of can scribed and pressure sensitive tape applied to film in scribed area. Adhesive tape is lifted and any lifting of the coating is noted.

TESTING

The aqueous resinous dispersions prepared as described above were then tested as coatings for the interior surfaces of metal cans. The testing was for phosphoric acid resistance, beer pasteurization resistance and enamel rater evaluation.

The phosphoric acid resistance test consists of storing a coated can filled with a 5 percent aqueous solution of phosphoric acid at room temperature. At the end of 10 days, phosphoric acid is removed and the coating is evaluated for any signs of deterioration. The phosphoric acid test gives an indication of the resistance of the coating to carbonated beverages.

The beer pasteurization resistance test consists of heating a sealed can filled with beer to 180° F. (82° C.) and holding for one hour. The film is then evaluated for deterioration and loss of adhesion.

The enamel rater test provides a measure of the continuity of the coating. Under conditions of this test, a low voltage is applied between an electrode immersed in a coated can closed at one end and filled with an electrolyte (1 percent NaCl solution). The presence of metal exposure is detected by a flow of current as indicated on an enamel rater meter available from the Waco Company. Since the magnitude of current which flows is related to the total area of metal exposure to the electrolyte, the meter reading (in milliamps) provides a relative measure of total exposed area on the coating surface.

In the enamel rater evaluations, coatings were applied to the interior surfaces of 12-ounce cans at coating temperatures of 72° F. (22° C.) and 120° F. (49° C.).

We claim:
1. A method of coating metal surfaces which comprises:
 (I) applying to the metal surface a coating composition comprising an aqueous base-solubilized resinous dispersion in which the resinous phase comprises:
  (A) 15 to 90 percent by weight of a base-solubilized acrylic polymer which is formed by solution polymerizing in the absence of primary and secondary alcohols other than ethanol, the following monomer charge:
   (1) 15 to 85 percent by weight of an alpha, beta-ethylenically unsaturated carboxylic acid,
   (2) 5 to 85 percent by weight of N-ethoxymethylacrylamide or N-ethoxymethylmethacrylamide,
   (3) 0 to 80 percent by weight of a copolymerizable
   vinyl monomer different from (1) and (2); the percentages by weight of (1), (2) and (3) being based on total weight of (1), (2) and (3);
  (B) 10 to 85 percent by weight of an epoxy resin; the percentages by weight of (A) and (B) being based on total weight of (A) and (B);
 (II) heating the metal surface to a temperature sufficient to coalesce and cure said coating composition.
2. The method of claim 1 in which (A)(1) is selected from the class consisting of acrylic acid and methacrylic acid.
3. The method of claim 1 in which (A)(2) is N-ethoxymethylacrylamide.
4. The method of claim 1 in which (A)(3) is styrene.

5. The method of claim 1 in which (B) is a polyglycidyl ether of a polyphenol.

6. The method of claim 5 in which the polyphenol is Bisphenol A.

7. The method of claim 1 in which the resinous dispersion additionally contains an aminoplast resin.

8. The method of claim 1 in which the metal surface is a container and the resinous dispersion is applied to the container's interior surface.

9. The method of claim 1 in which the metal is steel or aluminum.

10. A metal substrate coated by the method of claim 1.

11. The metal substrate of claim 10 which is in the form of a metal container and in which the resinous dispersion is applied to the container's interior surface.

12. The container of claim 11 which is made from aluminum or steel.

* * * * *